T. HEERMAN.
Coffee Roaster.
No. 21,416. Patented Sept. 7, 1858.
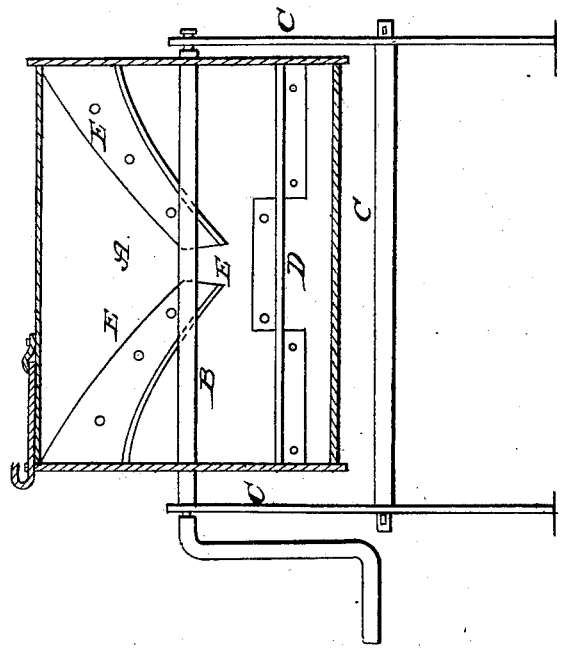
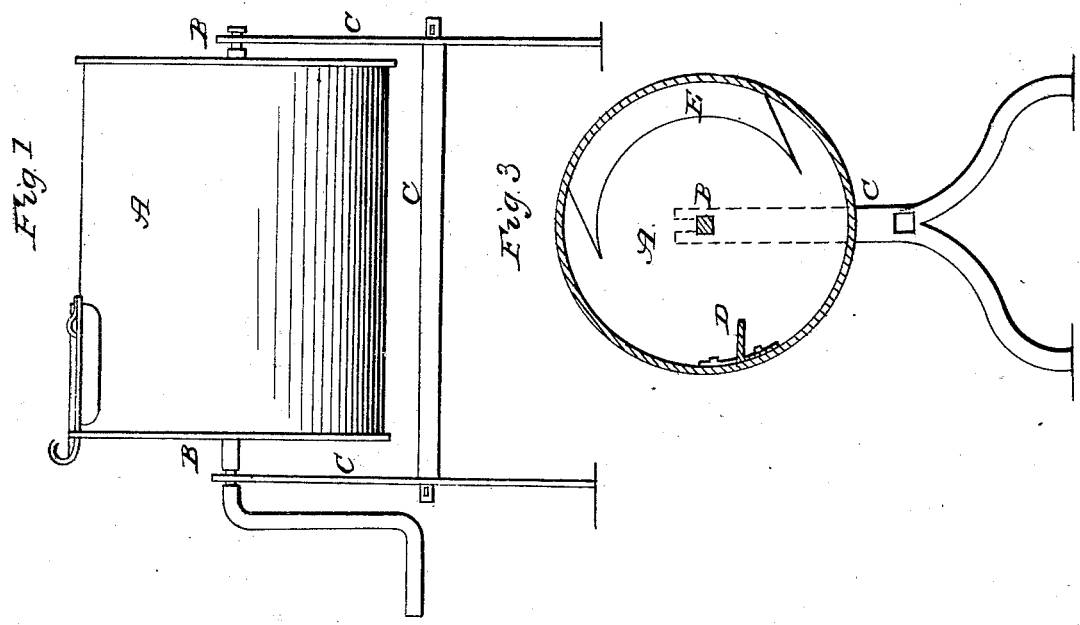

UNITED STATES PATENT OFFICE.

THEODORE HEERMAN, OF MITCHELLVILLE, TENNESSEE.

COFFEE-ROASTER.

Specification of Letters Patent No. 21,416, dated September 7, 1858.

*To all whom it may concern:*

Be it known that I, T. HEERMAN, of Mitchellville, in the county of Robertson and State of Tennessee, have invented a new and useful Improvement in Coffee-Roasters; and I do hereby declare that the following is a full, clear, and exact description of the same, reference being had to the accompanying drawings, forming a part of this specification, in which—

Figure 1, is a side elevation of a coffee roaster constructed with my improvement. Fig. 2, is a vertical longitudinal section of the same. Fig. 3, is a vertical transverse section of the same.

Similar letters of reference, in each of the several figures indicate corresponding parts.

The nature of my invention consists in the employment of two reversely inclined plates which have a space existing between their approximating ends on the inner circumference of a revolving coffee roasting cylinder which has its inner surface made otherwise plain, or furnished with a straight lifting shelf, as hereinafter specified.

By this invention as the cylinder rotates, the coffee, as fast as it naturally collects in piles at the heads of the cylinder is carried around and dropped upon the opposing angles of the concentrating plate and thereby thrown to the center of the cylinders' length. Thus inducing the coffee at intervals to pass to the center of the cylinder, keeps it constantly in motion, both in the path of a vertical circle and in an oblique direction and every grain is consequently brought in contact with the roasting surface and a more uniform, effectual and expeditious roasting accomplished.

To enable others, skilled in the art, to make and use my invention, I will proceed to describe its construction and operation.

A, represents the roasting cylinder. It should be hung on short journals on a central axis B, which is supported by a stand C.

D, is an elevating shelf projecting from the inner circumference of the cylinder A, as shown in Fig. 3.

E, E, are the reversely inclined concentrating plates projecting from the inner circumference of the cylinder A, as shown in Figs. 2 and 3 of the drawings. The concentrating plates E, E, are set so as to present opposing inclines and thus induce the coffee to slide down to the center of the cylinders' length and escape in a concentrated state at this point through the space E', existing between their approximating ends, on to the cylinders' surface, to be carried around shortly after by the motion of the cylinder or as soon as it has been thrown to the ends of the cylinder, and again dropped upon the concentrating plates, as above described.

What I claim as my invention and desire to secure by Letters Patent, is—

The employment of two reversely inclined concentrating plates which have a space existing between their approximating ends on the inner circumference of a revolving coffee roasting cylinder, substantially as and for the purposes set forth.

THEO. HEERMAN.

Witnesses:
  G. YORKE AT LEE,
  H. H. YOUNG.